Aug. 27, 1968   T. E. AREMAA   3,398,412
METHOD FOR PRECIPITATION OR WASHING OF
MATERIALS CONTAINING CELLULOSE
Filed Dec. 6, 1965
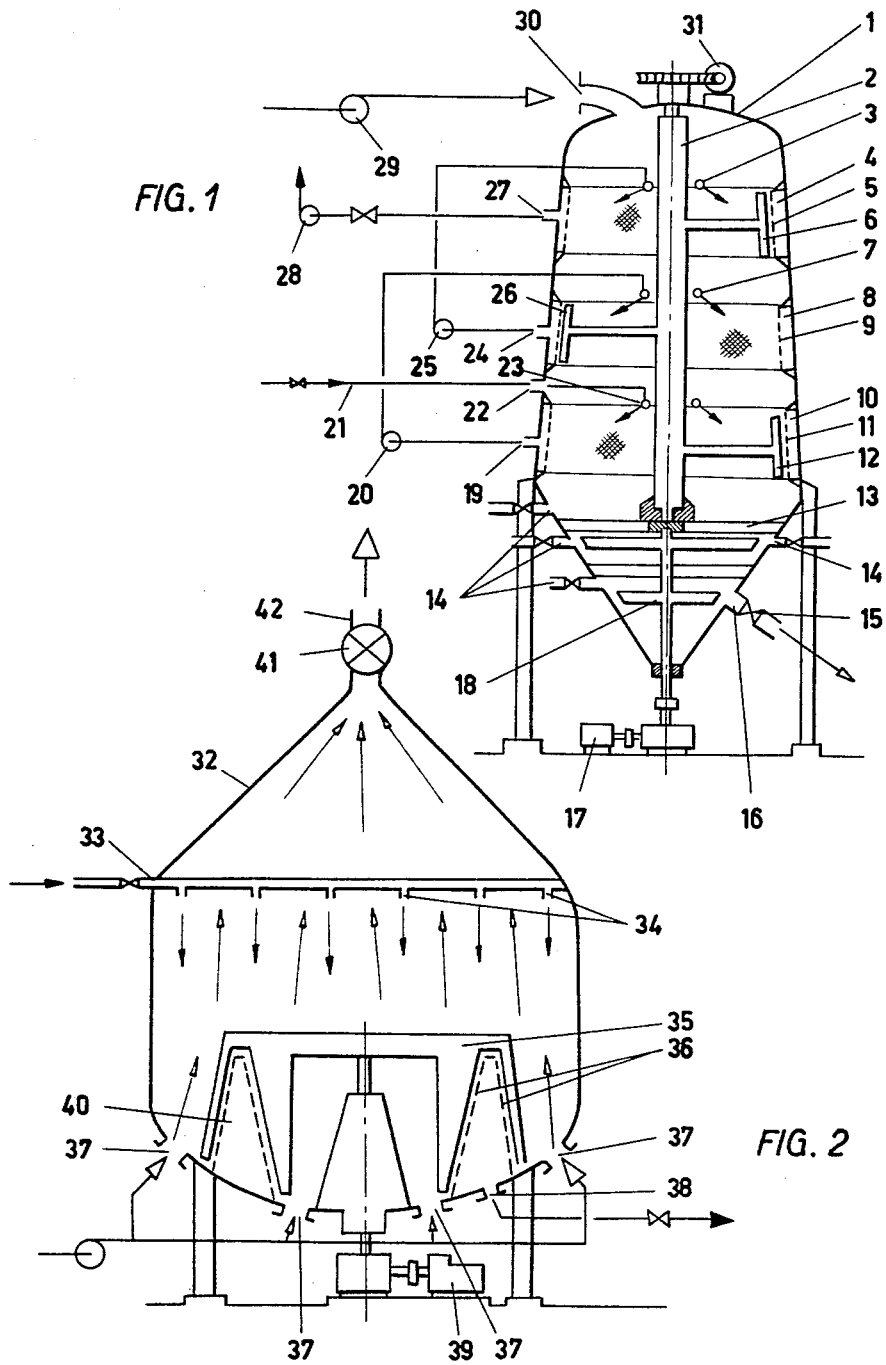
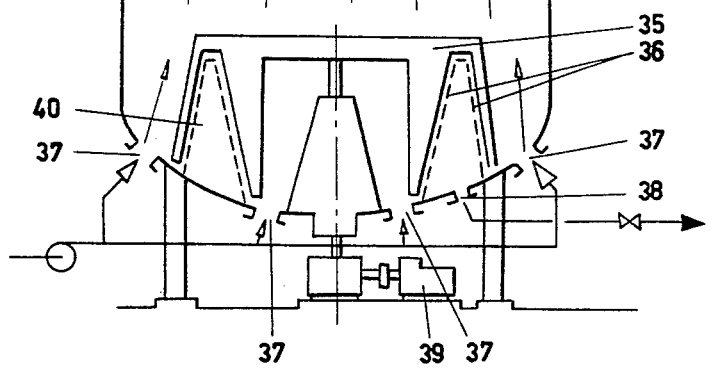
Inventor
Toivo Ensio Aremaa
Stevens, Davis, Miller & Mosher
Attorneys / 3,398,412
METHOD FOR PRECIPITATION OR WASHING OF MATERIALS CONTAINING CELLULOSE
Toivo Ensio Aremaa, Karhunkatu 32F19, Karhula, Finland
Filed Dec. 6, 1965, Ser. No. 511,634
Claims priority, application Sweden, Dec. 17, 1964, 15,309/64
4 Claims. (Cl. 8—156)

ABSTRACT OF THE DISCLOSURE

A method for thickening washed cellulose containing materials in a closed vessel having inlets, outlets and filtering surfaces therein comprising the steps of maintaining an over-pressure condition of 14 to 42 p.s.i. at the discharge end of the vessel by supplying the material thereto under pressure. The discharge of the material, solution separated therefrom and a washing solution are all controlled. The washing solution is directed against the flow of the material as a counterflow.

---

This invention relates to a method of thickening or washing of materials containing cellulose in a closed vessel provided with filtering surfaces and a device for carrying out the method.

It is already known that there is being used for washing of sulphate cellulose a so called discontinuously operating diffuser comprising a closed vessel to which the mass is blown in from the digester after finished cooking. The mass portion is led into the vessel from its upper end and is also washed by hot water led from the top part of the vessel and which is directed downwards to pass through the mass in the vessel. The lye, which has been washed off from the mass, is discharged from the bottom end of the vessel. During the washing procedure a pressure of about 28 p.s.i. is maintained at the top part of the vessel. After completed washing the mass is discharged through the outlet at the bottom of the vessel. It has been proved, that the velocity of the washing performance is not improved by increasing the above stated pressure, because the mass then becomes considerably more compact, whereas a reduced pressure on the other hand makes the washing process slower.

The disadvantage of a device like the above is its discontinuous operation. As the washing solution is led through the mass along with the flow with respect to the motion of the mass, and as the discharge from the vessel both of the lye as well as the mass thus is being arranged to take place at the same end of the vessel, the method is not appropriate for continuous use, in other words, for a continuous passing through of the mass to be treated. In case the discharge point for the mass should be continuously open, the lye should thus be allowed to pass along together with the mass, as the lye content is greater at the bottom part of the vessel, just at the exhaust area of the mass, to which point also the outlet for the lye is arranged.

It is also known that the treating of cellulose mass can be carried out by using a closed vessel of tower shape, in which procedure there is, for instance, chips of wood fed from the top end of the tower into the vessel and the thus produced mass is discharged at the bottom end of the tower, during which process the chips are falling slowly downwards through the tower, being forced through an impregnation, heating and boiling phase. The mass is discharged from the tower after passing a washing phase. The digestion of the mass is carried out at a temperature of about 160–170° C., which means that there is to be kept up in the whole tower a pressure of 10–15 atm./cm.² To the downwards passing mass, during the washing phase, a centrally directed washing solution is fed and is forcing radially outward towards the mantle of the tower, mainly in a transversal direction through the mass, where the washing solution is discharged.

The disadvantage in using a processing tower like this is the high pressure required for the washing performance, due to which reason the tower even for this phase has to be constructed to stand the stated pressure. Besides this, the washing phase requires additional height for the already rather high tower. On account hereof, the device becomes expensive and its running costs quite considerable.

The object of this invention is to eliminate the above stated disadvantages and the method according to the invention is in main characterized therein that for maintaining an overpressure, e.g. 14 to 42 p.s.i. in the upper part of the vessel the materials to be washed or thickened are continuously supplied under overpressure into the vessel, e.g., by pumping and the discharge of the treated material and/or the separated solution from the vessel is regulated, e.g. by throttling, portioning or by using counterpressure and that the separating solution respectively the washing solution is brought to flow substantially in countercurrent direction and/or transversely through the material in the vessel with respect to the direction of movement of the material.

According to the invention the washing of the mass is rendered possible as a continuous process in an appropriate pressure. By this means the purchase costs for the devices required for washing of the mass will become cheaper and the running costs reduced, as among other, the energy required for pumping. As the washing is carried out as a continuous process, there is attained a considerable capacity and the continuous process is further more adaptable to other processing phases in the washing procedure. The washed mass and separated lye may besides this most simply be by its own pressure fed along a pipe to the next phase in the procedure.

The invention is now described more particularly in the following with reference to the accompanying drawings, in which:

FIGURE 1 is a schematic view of a continuously operating washing vessel or diffuser for sulphite cellulose in axial section, and FIGURE 2 is a schematic view in axial section of a continuously operating diffuser for cellulose according to another embodiment.

The diffuser shown in FIG. 1 comprises a closed vessel 1, constructed for a working pressure of 28–42 p.s.i., the central part of which is constructed so that it extends conically downward, so that the treated mass should slide easily downwards. The upper part of the vessel is provided with an opening 30 for leading the mass to be washed into the vessel, and close to the bottom end of the vessel there is an opening 16 for discharging the washed and water diluted mass from the vessel. Between these inlet and outlet openings, close to the inner surface of the vessel, is mounted sieve-plates as filtering surfaces 5, 9 and 11, which sieve plates are provided with tapering holes of a size about $\phi$ 1.5 millimeters. The sieve plates are forming three separate rings in such manner that there is left between the vessel and its mantle three annular recesses 4, 8 and 10 for collecting the filtered lye. The mantle is provided with the openings 19, 24 and 27, at the portion adjacent the above recesses. To the center of the vessel is mounted an axle 2, the upper end of which is tightly fitted and secured with a bearing to the top gable of the vessel and the lower end of the axle is fitted with a bearing to the supporting beam 13 at the bottom part of the vessel, which beam is secured to the walls of the vessel. The motor 31, mounted on the cover of the vessel, turns the axle 2 by a worm wheel transmission gearing at a low speed, e.g., 1 r.p.m. To the axle 2 are fastened scrapers 6, 26 and 12 in such a manner that they are moving very close to the filtering surfaces 5, 9 and 11. These scrapers may be either perpendicular or arranged to be slanting so that their top ends are moving ahead, by which means the scrapers in their part are moving the mass downward. The vessel is provide with an opening 22, through which the washing-water is led through a nozzle to the tubular ring 23, situated near the axle 2. This tubular ring is situated so that the same is approximately at equal height with the upper edge of the lowest filtering ring 11 surface. Similar tubular rings, 3 and 7, are placed around the axle 2 at the center of the vessel, level with the upper edge of the other filtering rings 5 and 9, and the vessel is provided with openings through which the washing-water is led by connecting pipes to these rings. Into the lower conical section of the vessel are arranged devices for dispersion and dilution of the washed mass. For leading in the water for the dilution there is arranged openings 14 which are situated at different sides and heights in the lower section of the cone. For mixing of the mass there is used a mixer 18, the axle of which is mounted between beam 13 and the lower end of the vessel, which also is provided with a tightening box. The motor 17 is provided with a transmission gear which drives the mixer at the rate of about 120 r.p.m.

The size of the vessel is chosen according to the capacity and period required for the washing performance. In case there for instance has to be washed 500 tons of air dried pulp per day 90% cellulose and if the consistency of the mass is about 12% and if the washing period required for the quality of mass in question is 1 hour, the size of the vessel has to be about 160 m.³.

The digested mass from the digesting vessel is led to a suitable intermediary storage container, e.g., a blow tank, to be carried further to the vessel 1 by the pump 29 for high consistency mass or by a centrifugal pump, in which the consistency of the mass may be 4% or even up to 10%. In order to economize the pumping energy there is being strived after a higher mass consistency. The pump 29 maintains a continuous pressure of about 28 p.s.i. in the upper section of the vessel. The lye containing mass that has arrived into the upper section of the vessel 1 spreads itself over the whole earlier thickened blocking layer of mass. Hereupon is the lye that has arrived with the mass starting to flow by pressure effect through the blocking layer of mass and the filtering plates 5 into the recess 4 and further through the opening 27 out from the vessel. On the top of the blocking mass is in this way thickened a new mass layer. The consistency is by this means increased up to 12–14%, but not exceeding this limit, as the volume of the mass is not decreasing with higher consistencies. The quantity of the mass or its speed when passing through the vessel, is regulated by a valve or similar pressure standing regulator, which is mounted in the discharge opening 16. The thickened mass is passing through the vessel as a blocking member, which, however, changes its form when the cross-sectional area of the vessel changes. The above mass stopper is being dispersed in the conical bottom of the vessel. The mass then moves downward until the pressure in the opening 16 is less than that in the opening 30, but in this case furthermore due to the effect of its own weight. The even sliding movement of the mass is being improved due to the fact, that the center part of the vessel extends towards the discharge opening, that the inside surface of the vessel is made as smooth as possible, and, that the scrapers 6, 26 and 12 are removing the mass that possibly has adhered to the filtering surfaces 5, 9 and 11.

The washing process takes place according to the counter-current principle. The drawing illustrates a washing system with three phases, but in practice it becomes more economical to use at least six phases. Into the tubular ring 23 is led through the pipe 21 a continuous flow of water in a regulated quantity and at a regulated pressure which is greater than the pressure in the vessel. The water that thus arrives to the center of the mass-block is forcing the lye that is mixed with the mass through the filtering surface 11 into the pump 20. A part of the washing water remains in the washed mass and a part of it gets mixed with the lye that has been separated and arrives to the pump 20. The thus separated weak lye is by means of the pump 20 pumped through the tubular ring 7 to the center of the mass-block and is acting as washing solution at the middle height of the vessel. The filtrate, separated by the filtering surface 9, is pumped by pump 25 as washing solution through the tubular ring 3 to the upper section of the vessel, where the lye content in the mass is greatest (containing dry-stuffs to a great extent). The lye filtrate, which becomes separated through the filtering surface 5 and is collected by the annular recess 4, is pumped by pump 28 or led by its own pressure to the evaporator. When the washed mass arrives to the lower, conical section of the vessel, the same is dispersed by the mixer 18 and becomes diluted by water, led through the openings 14, to such degree that its consistency in the opening 16 is, e.g., about 3%. The washed mass can hereafter be led by its own pressure, for instance, to the pressure assorters. The washed mass may, if desirable, also be removed from the diffuser without dilution as a 12–14% mass. In this case there may as quantity regulator 15 be used a pump similar to a pump used for high consistency mass.

Depending on the material to be handled, the form of the vessel may vary in such manner that the center part of the vessel is of equal width or still more conical than shown in the drawing and, that the axle 2 with its driving devices and the scrapers 6, 26 and 12 may be omitted.

FIGURE 2 shows a diffuser in which the mass is moving from below upward and in which the washing water flows against the moving direction of the mass, i.e., from the top downward. This diffuser comprises a closed vessel 32, constructed for a working pressure of about 42 p.s.i., the vessel having at its bottom end intake openings 37 for the mass, filtering surfaces 36, which are forming an annular space 40 and an opening 38 for discharge of the lye accumulated into the space 40, a scraper device 35, driven by a motor 39 at, e.g., 1 r.p.m., which scraper device keeps the filtering surfaces 36 clean, nozzles 34 for the washing water arranged to the upper section of the vessel evenly with respect to the entire transversal plane of the vessel, to which nozzles the washing water is led along the pipe 33, and a discharge opening 42 for the washed mass arranged to the upper end of the vessel, which opening 42 is provided with a quantity regulator device 41.

The fresh mass to be washed is continuously pumped through the openings 37 to the lower section of the vessel at a pressure which at the upper section of the vessel is kept constant, e.g., at 28 p.s.i., whereat the speed of the passing mass is regulated by the device 41. Through the nozzles 34 is continuously led a suitable amount of washing water over the mass, the main part of which water flows through the slowly passing mass into the annular space 40 and further through the opening 38 to be led to the evaporator. The lye in the mass is likewise carried away by the flow of water and partly also as a diluent in the washing water. The higher the vessel is, the less lye there is being diluted in the water, whereas a greater capacity necessitates a vessel which is wide but low, in which case the washing water passes faster through the mass to be washed.

The drawings and the specification relative to these are naturally only intended to illustrate the inventive idea of the invention. The device applicable to carry out the method according to the invention may as to its details vary considerably within the scope and limits of the claims. In case there only is a question of precipitation of the mass, the device is not provided with pipes for the washing solution. The device may also be resembling a transporter of the screw type or a paternoster type transporter provided with elements suitable for the purpose. The method is neither limited to the handling of cellulose mass but may also be applied to, for example, the extraction of sugar beets and for handling of different alluvial stuffs.

What I claim is:

1. A method of separating liquid from cellulose containing materials in a closed vessel provided with filtering surfaces, comprising the steps of maintaining an overpressure of 14 to 42 p.s.i. in a discharge portion of the vessel, continuously supplying the materials to be washed into the vessel in an overpressure condition, regulating the discharge of the treated material, separated solution and washing solution respectively so that the washing solution flows through said material as a counterflow.

2. A method according to claim 1 in which washing liquid is continuously supplied under overpressure into the material for displacing the liquid to be separated.

3. A method of separating liquid from cellulose containing materials in a closed vessel provided with filtering surfaces, comprising the steps of maintaining an overpressure of 14–42 p.s.i. in a discharge portion of the vessel, continuously supplying the materials to be treated into the vessel in an overpressure condition, regulating the discharge of the treated material and separated liquid so that the separated liquid flows through said material substantially transversely with respect to the movement of the treated material.

4. A method according to claim 3 in which washing liquid is continuously supplied under overpressure into the material for displacing of the liquid to be separated.

References Cited

UNITED STATES PATENTS

| | | | |
|---|---|---|---|
| 1,933,609 | 11/1933 | Wagner | 68—205 X |
| 2,683,366 | 7/1954 | Kulvik et al. | 68—181 |
| 2,765,645 | 10/1956 | Hannunkari et al. | 68—181 X |
| 2,916,346 | 12/1959 | Jalkanen | 8—156 |
| 3,237,773 | 3/1966 | Laakso | 68—181 X |

FOREIGN PATENTS 416,600    7/1925    Germany.

WILLIAM I. PRICE, *Primary Examiner.*